United States Patent [19]

Glick

[11] 4,096,964

[45] Jun. 27, 1978

[54] UNIVERSAL ELECTRICAL OUTLET BOX AND METHOD OF INSTALLING

[76] Inventor: Earl Glick, 13015 Lincoln St., NW., Massillon, Ohio 44646

[21] Appl. No.: 803,364

[22] Filed: Jun. 3, 1977

[51] Int. Cl.² .............................................. H02G 3/08
[52] U.S. Cl. ..................... 220/3.4; 408/703; 220/3.8; 220/3.9; 52/221; 52/741; 29/406; 33/191; 408/204
[58] Field of Search .................. 220/3.3, 3.4, 3.5, 3.6, 220/3.7, 3.8, 3.9; 29/406, 407; 33/191; 408/204, 703; 339/147; 52/221, 741

[56] References Cited

U.S. PATENT DOCUMENTS

| | | | |
|---|---|---|---|
| 2,775,812 | 1/1957 | Mohr | 29/407 |
| 2,788,151 | 4/1957 | Shore | 220/3.4 |
| 2,815,144 | 12/1957 | Kullander | 220/3.8 |
| 2,898,688 | 8/1959 | Cottar | 220/3.4 |
| 3,160,458 | 12/1964 | Laudel, Jr. et al. | 408/204 |
| 3,253,730 | 5/1966 | Mount | 220/3.4 |
| 3,260,400 | 7/1966 | Miles | 220/3.4 |
| 4,023,697 | 5/1977 | Marrero | 220/3.3 |

*Primary Examiner*—William Price
*Assistant Examiner*—Joseph Man- Fu Moy
*Attorney, Agent, or Firm*—Brady, O'Boyle & Gates

[57] ABSTRACT

An electrical outlet box having a center threaded post is fastened solidly to a wall stud at a prescribed elevation above floor level. A section of dry wall is brought into position and a dry wall penetrating means temporarily telescoped with said post is employed to produce a locator opening through the dry wall section coaxially with the outlet box. A cutter means centered on the locator opening is employed to remove a plug of dry wall to thereby form a dry wall opening in registration with the mouth of the outlet box. The dry wall penetrating means is separated from the outlet box post and a unit for switches and/or receptacles including a cover plate is introduced through the dry wall opening into the mouth of the outlet box and secured by engagement of a single center screw fastener with the threaded post.

11 Claims, 15 Drawing Figures

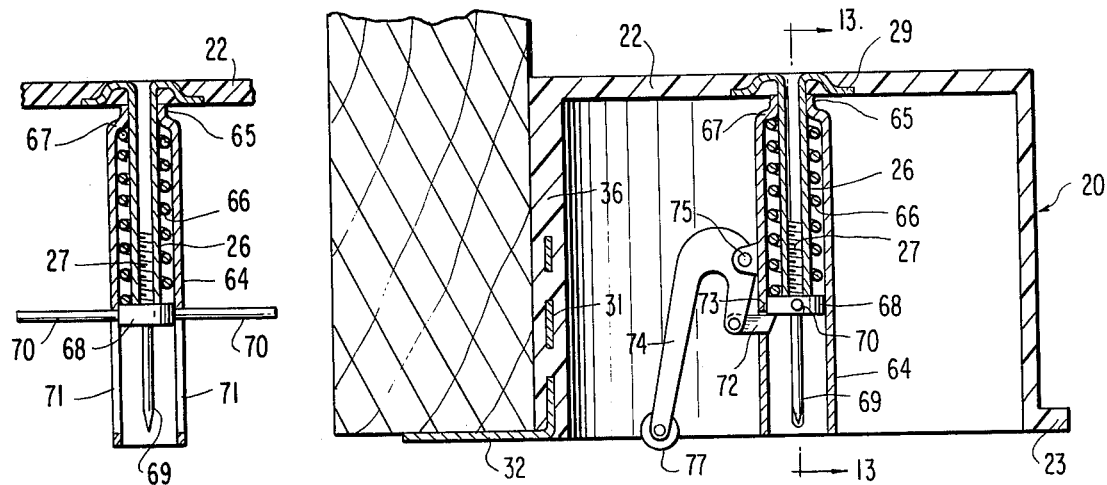
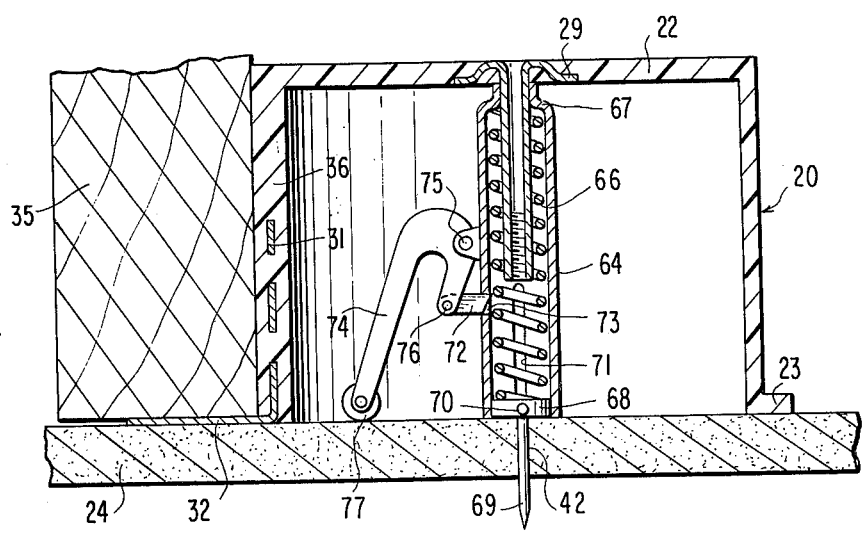
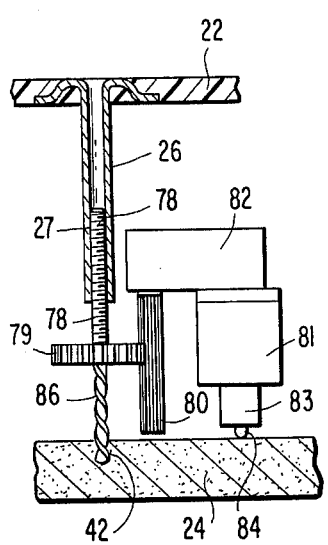
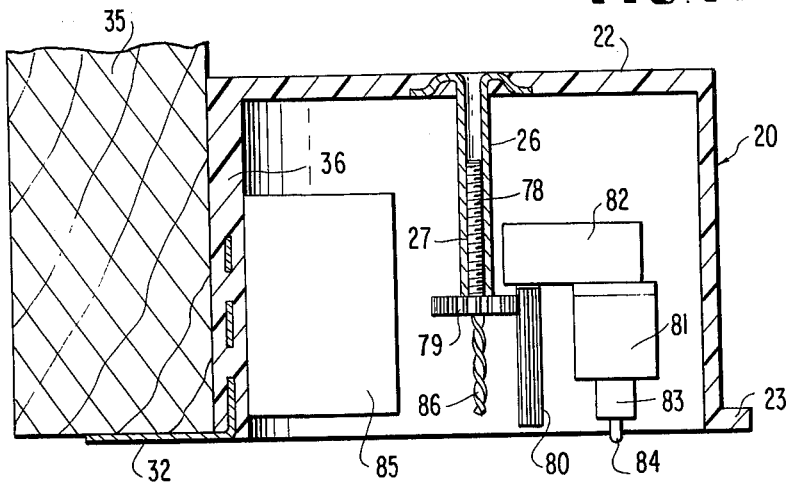

UNIVERSAL ELECTRICAL OUTLET BOX AND METHOD OF INSTALLING

BACKGROUND OF THE INVENTION

Electrical outlet boxes of various kinds are required by building codes to mount electrical switches and receptacles in walls of buildings with security and safety. Metal outlet boxes widely used at the present time are quite costly and the installation of outlet boxes, particularly in buildings where dry wall is employed, presents problems which heretofore have not been solved in a satisfactory manner. One such problem widely encountered by dry wall hangers and finishers is that of forming openings in the dry wall sections which align or register properly with previously installed outlet boxes on wall studs. While the dry wall hanger or installer may know the described elevation of outlet boxes above floor level, it is frequently very difficult to locate the dry wall openings in registration with the outlet boxes horizontally and in many cases patching and filling operations are required around the openings with the end result that the finished wall may be unsightly adjacent to outlet boxes.

In view of the above and other related installation problems well known to those skilled in the art, this invention has for its objective the provision of a more economical and more standardized universal outlet box of circular form which can be installed solidly on a wall stud, such as a 2 × 4. The circular outlet box is equipped with a center screw-threaded post having the multiple purpose of temporarily supporting a dry wall penetrating means, and thereby centering a rotary cutting means which removes a plug from the dry wall to form a dry wall opening in accurate registration with the mouth of the outlet box. Following removal of the penetrating means and associated cutting means, the screw-threaded post serves the additional purpose of engaging a center screw-threaded fastener used to attach a switch and/or receptacle unit in the mouth of the outlet box following placement of the unit through the registering dry wall opening.

All of the guesswork, haphazard and cut and fit practice of the prior art is avoided by means of the invention, and not only is labor reduced and parts standardized but a much better looking finished wall is achieved in the building and substantially all of the patch up work by dry wall installers and/or painters is eliminated.

Other features and advantages of the invention will become apparent during the course of the following description.

BRIEF DESCRIPTION OF THE DRAWINGS

FIG. 11 is a horizontal section similar to FIG. 3 showing a modified form of dry wall penetrating means in a retracted or cocked position.

FIG. 12 is a similar view showing the penetrating means in an active position after being triggered by placement of a dry wall section against a release mechanism.

FIG. 13 is a fragmentary vertical section taken on line 13—13 of FIG. 11.

FIG. 14 is a further cross section similar to FIG. 11 showing another form of dry wall penetrating means in a retracted position.

FIG. 15 is a fragmentary section similar to FIG. 14 showing the penetrating means activated by placement of a dry wall section in contact with an activating element.

DETAILED DESCRIPTION

Figure 1:
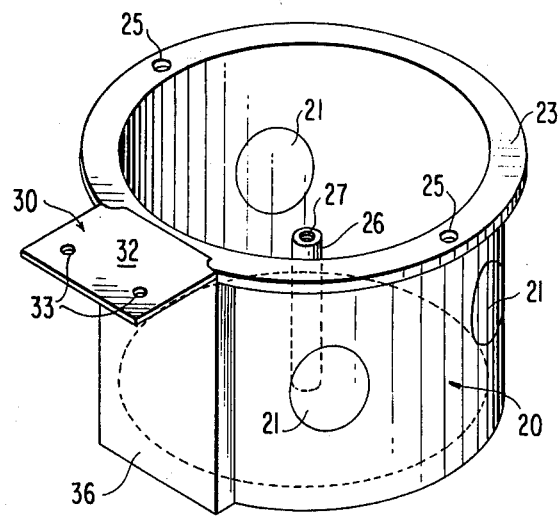
FIG. 1 is a perspective view of an electrical outlet box embodying the invention.

Referring to the drawings in detail wherein like numerals designate like parts throughout, and referring particularly to FIGS. 1 through 9 initially, the numeral 20 designates a substantially cylindrical outlet box preferably formed of a tough fracture-resistant plastics material and molded from such material as a unit. The outlet box 20 has a cylindrical side wall, as shown, provided with preferably four circumferentially equidistantly spaced knock-out plugs 21 to provide for the entrance of wires into the box after installation thereof. The box has a flat rear wall 22 and is open at its front away from the wall 22. A flat annular marginal flange 23 is formed on the front of the outlet box for abutment with the interior face of a dry wall panel or section 24 in the installation process. A pair of diametrically spaced apertures 25 are formed through the flange 23 for use with a safety adapter ring in some cases, as will be further described.

A center metallic tubular post 26 having a threaded bore 27 is provided on the box 20 for multiple important purposes and the axis of this post coincides with the axis of the cylindrical outlet box. The post 26 extends forwardly from the rear wall 22 and terminates somewhat forwardly of the mid-point of depth of the box between the rear wall 22 and flange 23.

At its rear end, the post 26 has a flat washer-like anchor plate 28 recessed into the outer face of wall 22, including a pair of depressed diametrically spaced anchor tabs 29 embedded and molded in the material forming the rear wall 22.

Somewhat similarly, a metallic L-shaped mounting bracket 30 for the outlet box 20 has one apertured web 31 thereof embedded in the side wall of the box 20 while the frontal web 32 of the mounting bracket 30 lies flush with the front face of the flange 23 and extends radially of the cylindrical box. The web 32 has a pair of nail receiving apertures 33 formed therethrough to facilitate attaching the outlet box by means of nails 34 to a wall stud 35, such as a 2 × 4.

For added stability of mounting and firmness, a flat bearing pad 36 of increased thickness is molded on the cylindrical side wall of the box 20 adjacent to the mounting bracket 30, and the web 31 is actually embedded within this pad. When the box 20 is installed as shown in FIG. 2, the flat surface of the pad 36 abuts one side of the stud 35 solidly while the web 32 is nailed against the adjacent right angular surface of the stud, as illustrated.

Figure 2:
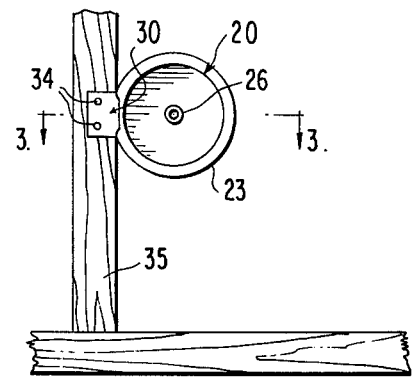
FIG. 2 is a front elevational view of the outlet box installed on a wall stud.
Figure 4:
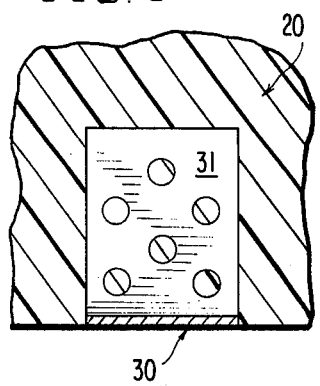
FIG. 4 is a fragmentary vertical section taken on line 4—4 of FIG. 3.
Figure 3:
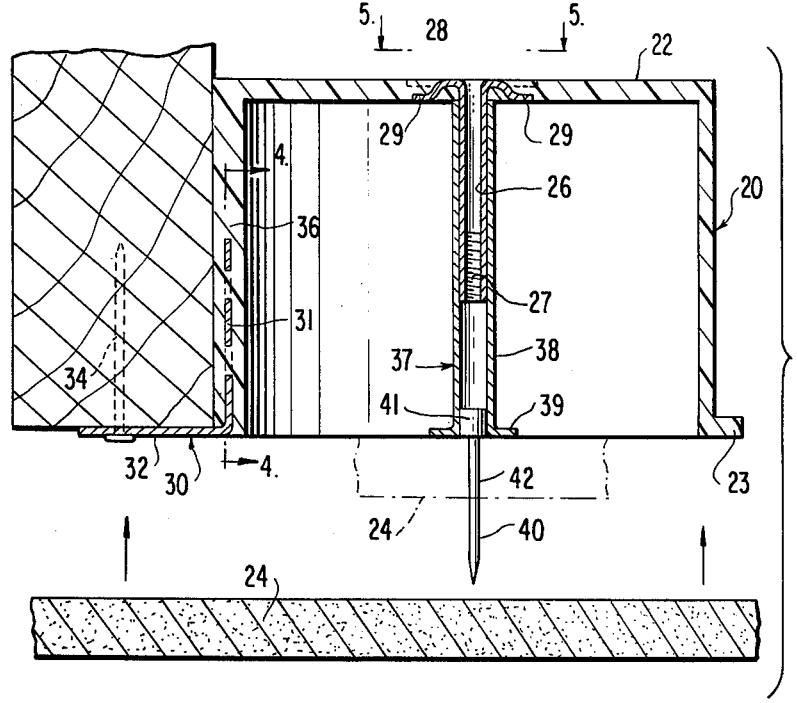
FIG. 3 is an enlarged horizontal section taken on line 3—3 of FIG. 2 and also illustrating the use of a dry wall penetrating means temporarily coupled to a center post of the outlet box.
Figure 5:
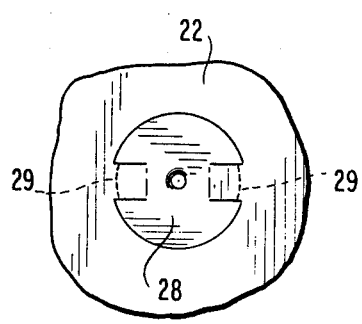
FIG. 5 is an enlarged rear elevational view taken on line 5—5 of FIG. 3.

After installation of the outlet box 20 on a wall stud 35 at a prescribed elevation above floor level, as shown in FIG. 2, the axis of the post 26 extends horizontally or parallel to the floor as does the axis of the outlet box. At this time, a dry wall penetrating means 37 is temporarily coupled with the post 26 for the purpose of producing a locater opening in the dry wall panel 24 as the panel is moved into engagement with the front vertical faces of wall studs 35 making up the framing for a wall. More particularly, the penetrating means 37 comprises a sleeve 38, FIG. 3, which telescopes over the post 26 so that its rear end abuts the box wall 22. The forward end of sleeve 38 has a flat flange 39 whose forward face is flush with box flange 33. A forwardly projecting pointed penetrating pin 40 has an enlarged head 41 fixed by welding or the like in the bore of sleeve 38 so that the penetrating pin is rigid with the sleeve. With the parts arranged as shown in FIG. 3, the dry wall panel 24 is moved into position and will engage the penetrating pin 40 and after tapping with a mallet or other broad faced implement, the pin 40 will penetrate through the dry wall panel and produce a small locater opening 42, FIG. 3, therein. At this time, the dry wall installer can complete the attachment of the dry wall panel 24 to the studs in the usual manner.

Figure 6:
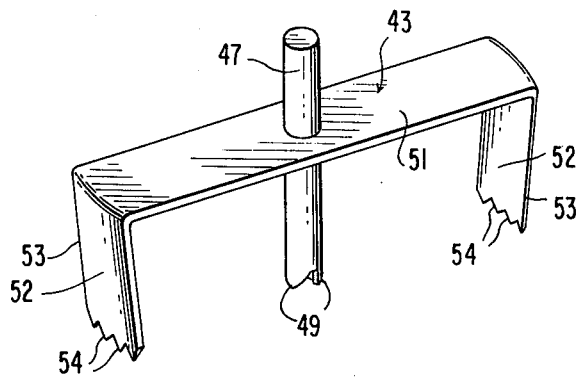
FIG. 6 is a perspective view of a rotary cutter used in the method of installing outlet boxes in relation to dry wall panels according to the invention.
Figure 7:
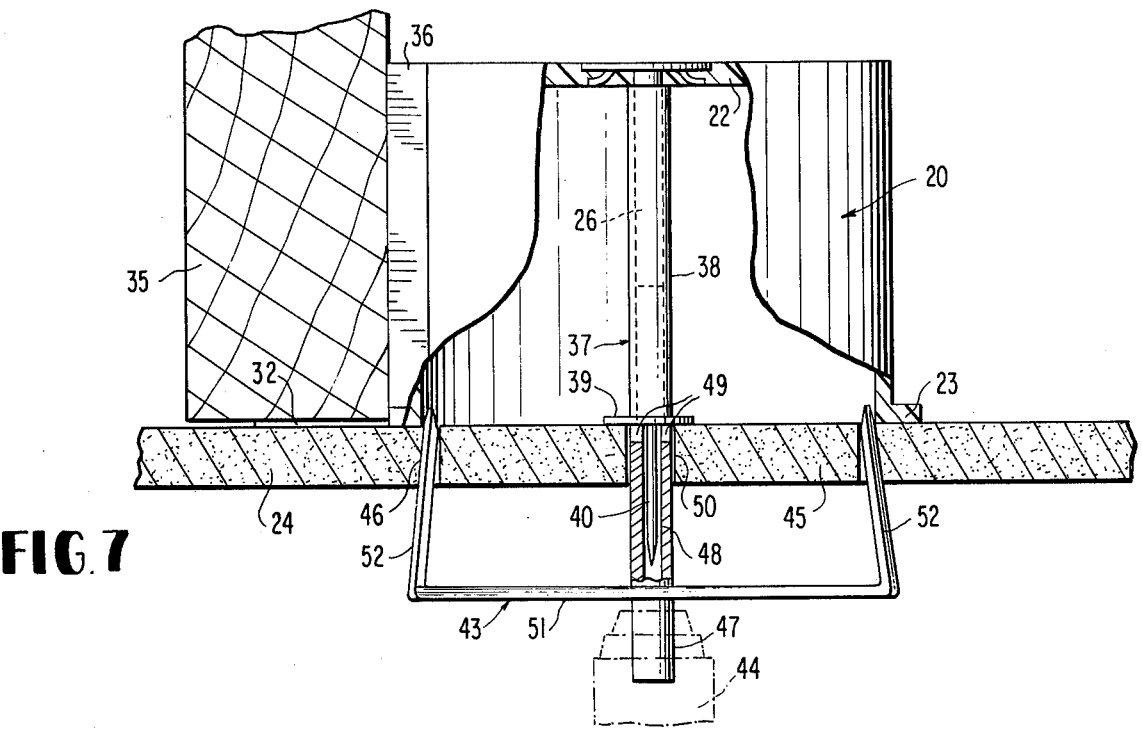
FIG. 7 is a horizontal section, partly in elevation, similar to FIG. 3, showing the use of the cutter for removing a plug of dry wall to produce an opening in registration with the mouth of the installed outlet box.

Following this operation, and referring to FIG. 7, a rotary cutter 43, FIG. 6, is now utilized in connection with a driving device, such as an electric hand drill 44 for cutting a plug 45 from the dry wall panel 24 and thereby forming an opening 46 in the panel accurately registering with the mouth of outlet box 20. The cutter 43 has a center spindle 47 adapted to be engaged by the chuck of hand drill 44 and rotated. The leading end of the spindle 47 has a bore 48 which engages telescopically over the penetrating pin 40 as a guide, thus centering the cutter 43 on the axis of the locater opening 42 and pin. The leading tip of the spindle 48 has cutting teeth 49 which are sharp on their side edges only and not on their forward extremities. When the cutter 43 is rotated, these teeth readily bore through the dry wall panel 24 around the pin 40 until the forward tips of the teeth 49 contact the flange 39 which serves to stop the cutter from further movement into the outlet box 20 where wiring has already been placed. The opening produced by the boring teeth 49 is indicated at 50 in FIG. 7.

The rotary cutter 43 further comprises a cross bar 51 rigidly secured to the spindle 47 and extending on opposite sides thereof. At its opposite ends, this cross bar carries a pair of cutting blades 52 having corresponding sharp cutting edges 53 and leading end cutting teeth 54. The cutting blades 52 converge somewhat toward their leading ends so that the opening 46 produced in the dry wall panel will be tapered to facilitate placement therethrough of a unit 55, FIG. 8, for switches and/or receptacles, to be further discussed. During rotation of the cutter 43, the two blades 52 form the tapered opening 46 in registration with the mouth of the outlet box 20 simultaneously with the boring of the center opening 50. As stated, the flange 39 limits the penetration of the cutting tool 43 into the outlet box 20 to the position shown in FIG. 7 so there will be no danger of cutting the wiring.

Figure 8:
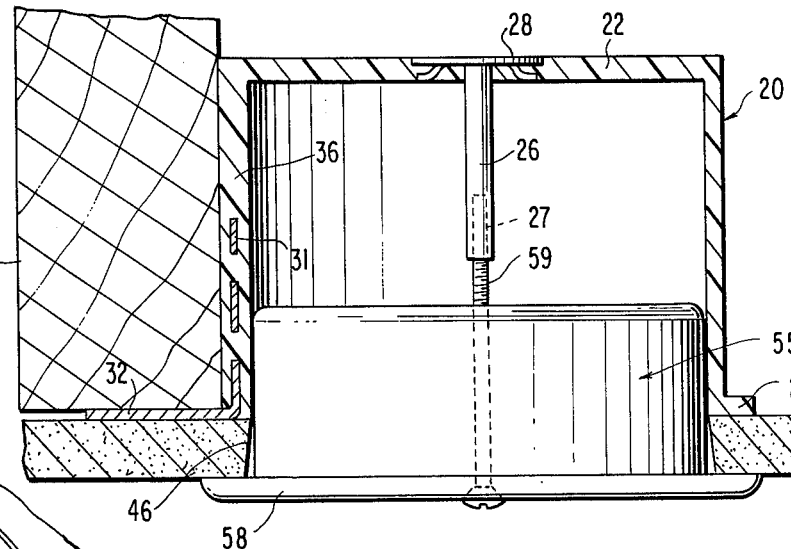
FIG. 8 is a similar view showing a unit for switches and/or receptacles joined with the outlet box by a single center attaching screw having threaded engagement with the outlet box post following removal of the penetrating and dry wall cutting means.
Figure 9:
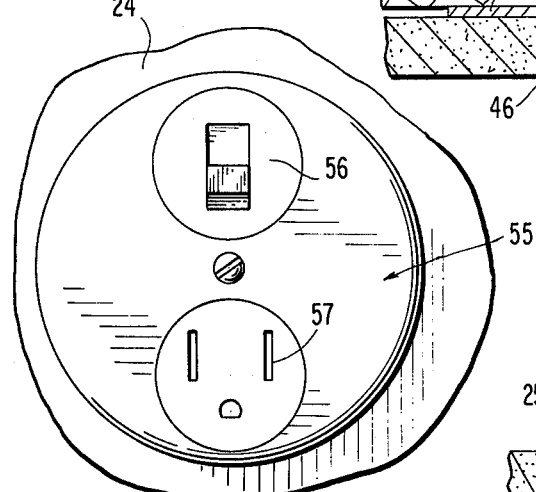
FIG. 9 is a front elevational view of the unit for switches and/or receptacles shown in FIG. 8.

When the described operation of the cutter 43 is completed, the cutter is removed from the pin 40 and the dry wall plug 45 falls away leaving the clean opening 46 through the dry wall panel. The penetrating unit 37 is now removed from the post 26 and the unit 55 which may contain a switch 56 and a receptacle 57 or the like, FIG. 9, is simply slipped into place in the mouth of the outlet box 20 by passing it through the tapered opening 46 of the dry wall panel 24. As shown in the drawings, the assembled components are all circular in cross section for easy and foolproof assembly, including the unit 55. The shell of unit 55 is preferably formed of plastics material and the unit includes an integrated exterior cover plate 58 which laps the margin of the opening 46 and abuts the outer surface of the dry wall panel 24 to provide a finished appearance. The unit 55 is secured within the box 20 by a single center screw 59 which engages in the threaded bore 27 of the post 26, as shown in FIG. 8. The unit 55 can be provided with two receptacles 57 or two switches 56, or one of each, as illustrated in FIG. 9.

A very important feature of the invention which makes the above-described method of installation feasible is the ability of the outlet box 20 when installed on a stud 35 to withstand the forces placed on it when the dry wall panel 24 is moved against the penetrating pin 40 and when the rotary cutter 43 is operated, as described. The face-to-face engagement of the flat bearing pad 36 of the outlet box with one side of the stud 35 while the attaching web 32 of mounting bracket 30 is nailed against the right angular forward face of the stud 35 renders the mounting of the box 20 very rigid and stable. The outlet box will not twist relative to the stud 35 or yield inwardly responsive to force the dry wall panel 24 or cutter 43.

It may now be seen that the unique outlet box 20 and the method of installing it insures proper registration of dry wall openings 46 with the boxes and ease of installation of the units 55. The method eliminates the usual patch-up work on dry wall panels around openings which are not properly aligned with outlet boxes. The invention reduces labor, cost of materials is lessened and a much better looking finished wall is the result.

Figure 10:
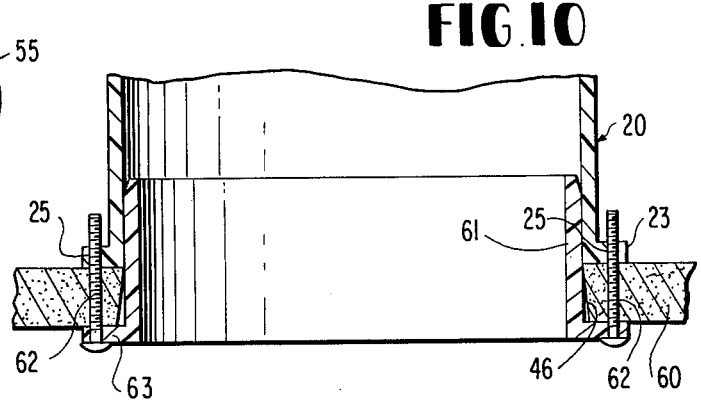
FIG. 10 is a cross sectional view similar to FIG. 8 showing a required safety adapter ring for ceiling lights in conjunction with an outlet box.

FIG. 10 shows a variant of the invention wherein one of the boxes 20 is installed above a ceiling panel 60 and a safety adapter ring 61 of plastics material is introduced through the opening 46 and into the mouth of the box 20, as shown. A pair of attaching screws 62 are used to secure the adapter ring 61 in place and the adapter ring has a lower end annular apertured flange 63 to receive the screws 62 which are also engaged with the previously identified threaded apertures 25 of flange 23. The arrangement is employed particularly in connection with the installation of ceiling light fixtures.

FIGS. 11 to 13 show a second embodiment of dry wall panel penetrating means to produce the locater opening 42 shown in FIG. 3. This penetrating means comprises a sleeve 64 having a reduced diameter rear end portion 65 which telescopes over the post 26 and abuts the rear wall 22 during usage. The sleeve 64 contains a strong expansion coil spring 66 disposed between a shoulder 67 of the sleeve 64 and an enlarged head 68 of a dry wall penetrating pin 69 to which the head is attached. The cylindrical head 68 has guided engagement inside of the bore of sleeve 64. The head 68 carries a pair of radial handle extensions 70 extending movably through diametrically spaced longitudinal slots 71 formed in the frontal portion of sleeve 64. The penetrating pin 69 can be manually retracted to compress the spring 66 by use of the handle extensions 70, and is releasably held in this retracted or latched position, FIG. 11, by a latch element 72 operating through a side aperture 73 in sleeve 64. A trigger arm 74 is pivoted at 75 to one side of the sleeve 64 near the longitudinal center thereof and is further pivotally connected at 76 to the latch element 72 so that pivoting of the trigger arm 74 will withdraw the latch element from beneath the head 68 and allow the compressed spring 66 to drive the penetrating pin 69 through the dry wall panel 24, FIG. 12, to produce the locater opening 42.

The pivoted trigger arm 74 has a contact roller 77 at its leading end which responds to placement of the panel 24 against the wall studs 35, FIG. 12, and releases the latch element 72 from holding engagement beneath the retracted head 68 so that the penetrating pin 69 will be thrust forwardly to produce the locator opening 42. Following formation of the opening 42, the rotary cutter 43 may be employed in substantially the same manner illustrated in FIG. 7 to produce the required opening 46 in the dry wall panel, following which operation the sleeve 64 and all parts associated therewith and the cutter 43 are removed so that the installation of the unit 55 can take place in the exact manner previously described. The method of installation is unchanged except for the use of the spring-loaded penetrating pin 69 in lieu of the rigid pin 40 of the prior embodiment but in both embodiments, the pins locate the center of a box from the inside-out.

FIGS. 14 and 15 show another embodiment of means to penetrate the dry wall panel 24 for the purpose of producing the locator opening 42 in the panel. In this embodiment shown somewhat schematically in the drawings, the penetrating means comprises a threaded spindle 78 having screw-threaded engagement in the threaded bore 27 of fixed post 26. The threaded spindle 78 carries a spur gear 79 forwardly of the post 26 meshing with an elongated parallel axis drive gear 80 driven by a small electric motor 81 through a gear speed reducer 82 formed as a unit with the motor and drive gear 80. A microswitch 83 for the control of drive motor 81 has an actuator element 84 projecting forwardly of the open face of box 28 to sense the placement of the dry wall panel 24, FIG. 15, in its use position. A battery pack 85 is provided to power the motor 81. A drill bit 86 is secured to the gear 79 rigidly and extends axially forwardly thereof, whereby driving of the gear 79 by the long gear 80 will cause unscrewing of the threaded spindle 78 from the post 26 and forward feeding of the drill bit into the panel 24, FIG. 15, to produce the required locator opening 42 therein. After this operation is completed, the cutter 43 is employed over protruding drill bit 86, as previously described, and after the plug 45 is removed the described inside-out panel penetrating means including the threaded spindle 78 is removed from the box 20, to prepare for the placement of the unit 55 and its single attaching screw 59. Except for the use of the drill bit penetrating means in FIGS. 14 and 15, the method embodying the invention is unchanged from the prior embodiments and the identical improved universal outlet box 20 is employed in all embodiments.

One further embodiment of dry wall panel penetrating means, not shown in the drawings, may be employed if desired. This means is very similar to the means shown in FIGS. 14 and 15. However, in lieu of the threaded spindle 78 of these figures, a smooth cylindrical spindle is placed rotatably in the bore of the post 26 and the same gear 79 and drill bit 86 are carried by the smooth spindle. Also, the same motor 81, microswitch 83, gear box 82 and gear 80 are employed, as previously described. A compression spring surrounding the post 26 bears against the rear face of the gear 79 and thrusts the gear and the drill bit 86 forwardly to produce the locator opening 42 in the dry wall panel 24 when the motor is turned on responsive to placement of the panel 24. In this embodiment, a solenoid operated latch element, similar to the latch element 72 is required to hold the drill bit retracted as in FIG. 14 and to release it when the dry wall section 24 is placed and engages the element 84. At this time, the spring behind the gear 79 will push the revolving bit 86 forwardly into the dry wall panel to produce the locator opening 42 while the gear is being rotated. Thus, the forward feeding of the drill bit is not dependent on threaded engagement with the post 26 as in FIGS. 14 and 15. The advantages of the arrangement should be apparent. Otherwise, the invention is identical to the prior embodiments which all provide a protruding box locator pin from the inside of the panel to the outside of the panel, located centrally of the box.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A method of installing an electrical outlet box in a building wall in relation to a dry wall panel comprising the steps of firmly attaching a substantially circular cross section outlet box to a wall frame member, the outlet box having a forward mouth facing a dry wall panel and a center screw-threaded post fixed therein, temporarily engaging a dry wall panel penetrating means with said post to position the penetrating means for producing a locater opening through a dry wall panel, placing a dry wall panel in an installed position on said wall and substantially simultaneously causing movement of the penetrating means relative to the dry wall panel to produce a locator opening through the dry wall panel, centering a rotary cutter means on the locator opening and rotating the cutter means to form a larger opening through the dry wall panel in substantial registration with the mouth of the outlet box, separating said rotary cutter means and said penetrating means from the outlet box, inserting a switch and/or receptacle unit through said larger opening into the mouth of the outlet box, and engaging a screw-threaded fastener for said unit with said threaded post.

2. The method of claim 1, wherein said penetrating means is a rigid means projecting forwardly of the mouth of the outlet box and said relative movement caused by shifting the dry wall panel into covering relationship with the mouth of the outlet box.

3. The method of claim 1, wherein said penetrating means is a spring-urged means retracted in the a mouth of the outlet box and having a release trigger element forwardly of said mouth, and said relative movement caused by shifting the dry wall panel into contact with said release trigger element.

4. The method of claim 1, and said penetrating means comprising a power-operated drilling means within the outlet box and having an actuator element forwardly of said box, and said relative movement caused by shifting the dry wall panel into contact with the actuator element.

5. An electrical outlet box and installation means comprising a substantially cylindrical outlet box body having an open forward end and a flat annular flange adjacent the open forward end, the box body having a rear wall, a central threaded axial post on the rear wall and extending forwardly thereof in the box body, a mounting bracket means on the box body including a forward end apertured attaching web adapted for securement to a wall stud, a dry wall panel penetrating means temporarily telescopically engaged with said threaded post and extending axially forwardly of the post and being readily separable from the post after usage, and a rotary cutter means adapted to be centered on the penetrating means for producing a dry wall panel opening in substantial registry with said open forward end.

6. An electrical outlet box and installation means as defined in claim 5, and said penetrating means comprising a sleeve telescoped over said post and projecting forwardly of the post and having a forward end substantially flush with the forward end of said box body, and a dry wall panel penetrating pin rigidly anchored to said sleeve and projecting forwardly thereof, said rotary cutter means having a tubular spindle adapted to telescope over said pin for guiding the cutter means during its rotational movement.

7. An electrical outlet box and installation means as defined in claim 6, and a frontal flange on said sleeve forming a limit stop for the axial movement of said tubular spindle.

8. An electrical outlet box and installation means as defined in claim 6, and said rotary cutter means further comprising cutting teeth on the leading end of the tubular spindle having side cutting edges, a cross bar on the spindle extending beyond opposite sides thereof, and a pair of cutting blades on opposite ends of the cross bar having leading end cutting teeth and side cutting edges.

9. An electrical outlet box and installation means as defined by claim 5, and said penetrating means comprising a sleeve telescoped over said post and extending forwardly of the post, a spring-urged dry wall panel penetrating pin within said sleeve, and releasable latch means on the sleeve adapted to hold the spring-urged pin in a retracted position rearwardly of the open forward end of said box body, said releasable latch means having a contact part forwardly to said open forward end responding to contact by a dry wall panel to release the latch means whereby the spring-urged pin is projected into penetrating engagement with the panel.

10. An electrical outlet box and installation means as defined in claim 5, and said penetrating means comprising a rotary power driven dry wall panel drilling means within said outlet box body including a spindle having threaded engagement with said threaded axial post.

11. An electrical outlet box and installation means as defined in claim 10, and an actuator element for said rotary power driven drilling means forwardly of the open forward end of the outlet box body and responding to engagement by a dry wall panel to turn on said drilling means.

* * * * *